United States Patent
Martinez

(10) Patent No.: US 6,497,387 B2
(45) Date of Patent: Dec. 24, 2002

(54) BREATHING MASKS BOX FOR EMERGENCY EQUIPMENT

(75) Inventor: Patrice Martinez, Plaisir Cedex (FR)

(73) Assignee: Intertechnique, Plaisir (FR)

( * ) Notice: Subject to any disclaimer, the term of this patent is extended or adjusted under 35 U.S.C. 154(b) by 0 days.

(21) Appl. No.: 09/929,058

(22) Filed: Aug. 15, 2001

(65) Prior Publication Data

US 2002/0030140 A1 Mar. 14, 2002

(30) Foreign Application Priority Data

Aug. 17, 2000 (FR) .............................................. 00 10677

(51) Int. Cl.[7] .............................................. B64D 13/00
(52) U.S. Cl. .................................................. 244/118.5
(58) Field of Search ......................... 244/118.5; 128/203, 128/204, 202.2, 205.25, 204.29; 206/570, 438

(56) References Cited

U.S. PATENT DOCUMENTS

| | | | | |
|---|---|---|---|---|
| 3,981,302 A | * | 9/1976 | Veit | 128/202.26 |
| 4,023,874 A | * | 5/1977 | Jong et al. | 244/118.5 |
| 4,057,205 A | * | 11/1977 | Vensel | 137/88 |
| 4,609,166 A | * | 9/1986 | Brennan | 244/118.5 |
| 5,078,343 A | * | 1/1992 | Howlett | 128/204.29 |
| 5,154,374 A | * | 10/1992 | Beroth | 244/118.5 |
| 5,165,625 A | * | 11/1992 | Gutman | 128/201.28 |
| 5,253,907 A | * | 10/1993 | Schnoor et al. | 292/252 |
| 5,803,062 A | * | 9/1998 | Aulgur | 128/202.26 |
| 5,803,602 A | | 9/1998 | Eroglu et al. | |
| 5,809,999 A | * | 9/1998 | Lang | 128/200.24 |
| 5,816,244 A | * | 10/1998 | Aulgur | 128/202.26 |
| 6,318,364 B1 | * | 11/2001 | Ford et al. | 128/204.18 |
| 6,336,667 B1 | * | 1/2002 | Ford et al. | 128/206.27 |

FOREIGN PATENT DOCUMENTS

| | | | | |
|---|---|---|---|---|
| FR | 1214998 | | 4/1960 | |
| GB | 2255509 A | * | 11/1992 | A62B/25/00 |

* cited by examiner

Primary Examiner—Charles T. Jordan
Assistant Examiner—Kevin Jakel
(74) Attorney, Agent, or Firm—Larson & Taylor PLC

(57) ABSTRACT

A box for housing breathing masks in a passenger aircraft has a housing closed by a door and a pipe in the housing for delivering respiratory gas under a first pressure to the masks via a flexible line. In rest condition a catch holds the door in closed position. It may be disabled for providing access to the masks. A command, electrical or in the form of a second pneumatic pressure in the pipe, limits the opening of the box to a partially-open position preventing the masks from falling out upon release of the latch.

11 Claims, 5 Drawing Sheets

BREATHING MASKS BOX FOR EMERGENCY EQUIPMENT

BACKGROUND OF THE INVENTION

The present invention relates to boxes for housing breathing masks used on board aircraft in order to accommodate such masks and comprising a door which is opened in such a way that each mask drops down at the disposal of a passenger and is supplied with a breathable gasp generally oxygen, in the event of depressurization.

For that, the boxes, each of which contains one or more masks, are normally kept closed by a catch. The catches of all the boxes are simultaneously disarmed in an emergency by supplying the mask supply pipes at a pressure higher than a determined threshold or by sending an electrical command to them.

The boxes have to be checked systematically on a regular basis. To do that, the box is opened manually by an operator who checks that a mask is stored and connected to the gas supply. During this operation, it often happens that a mask drops down and has to be put back, this being a tricky operation which takes time even though time is limited, especially when the operation is performed immediately before boarding.

SUMMARY OF THE INVENTION

It is an object of he present invention to provide boxes that make checking easier. To this end there is provided a box, the catch of which is associated with means which are rendered active by command, for example in response to a second pneumatic pressure (lower than a first pressure which disarms the catches when the catches are disarmed by applying a pneumatic pressure to the mask supply pipe), or via an electrical route, the said means then limiting the opening of the box to a partially opened position which prevents the mask or masks from dropping out when the catch is subsequently disarmed.

In an embodiment, said means consist of a plunger carried by the door, urged by return means into a position in which it is inactive and moved pneumatically into a position in which it cooperates with means carried by a housing of the box so as to limit the opening of the door when this plunger is moved by applying the second pressure. The door catch may be a simple magnet-ferromagnetic component assembly, the force of attraction of which is overcome by a push-rod when the latter is subjected to a breathable-gas pressure higher than a determined threshold.

The invention also has a second aspect, which can advantageously be used with the first, but which may be used independently thereof, takes account of the fact that the oxygen supply available on board an aircraft is limited. Following depressurization at high altitude, the masks drop down, the passengers are permanently supplied as soon as they open the individual supply tap to the mask by pulling on a cord to which the mask is attached, and the crew begins a descent then generally cuts off the oxygen supply once the aircraft has returned to about 10,000 feet or 3000 metres.

However, there is then the problem of maintaining an oxygen supply to those of the passengers who have not coped well with the depressurization or whose state of health so demands. The use of portable oxygen cylinders, which are bulky and heavy, provides only a rather unsatisfactory solution. Maintaining the supply by asking the cabin crew to shut off all the oxygen inlet taps of the masks other than those to which a supply needs to be maintained takes a great deal of time.

The invention also sets out to provide a masks box and an emergency oxygen supply device to address the above difficulties. To this end there is provided a box comprising, in addition to the tubes supplying the masks receiving the oxygen through a valve that opens automatically in the event that a supply pressure at least equal to a first value p1 is provided via an inlet pipe, an oxygen tapping equipped with a valve that opens automatically for as long as the pressure in the pipe exceeds a second value p3, less than p1 and possibly less than p2.

The pressures p1 and p3 may, for example, lie respectively between 3 and 4 bar and between 2 and 2.5 bar with respect to the pressure in the cabin. When the box is fitted with a catch allowing its opening to be limited, the pressure p3 will be chosen to be lower than p2. The following levels are, for example, possible:

p1: 350 kPa
p2: 240 kPa
p3: 200 kPa

The above characteristics, together with others, will become better apparent from reading the description which follows of some particular embodiments which are given by way of non-limiting examples. The description refers to the accompanying drawings.

DETAILED DESCRIPTION

Figure 1:
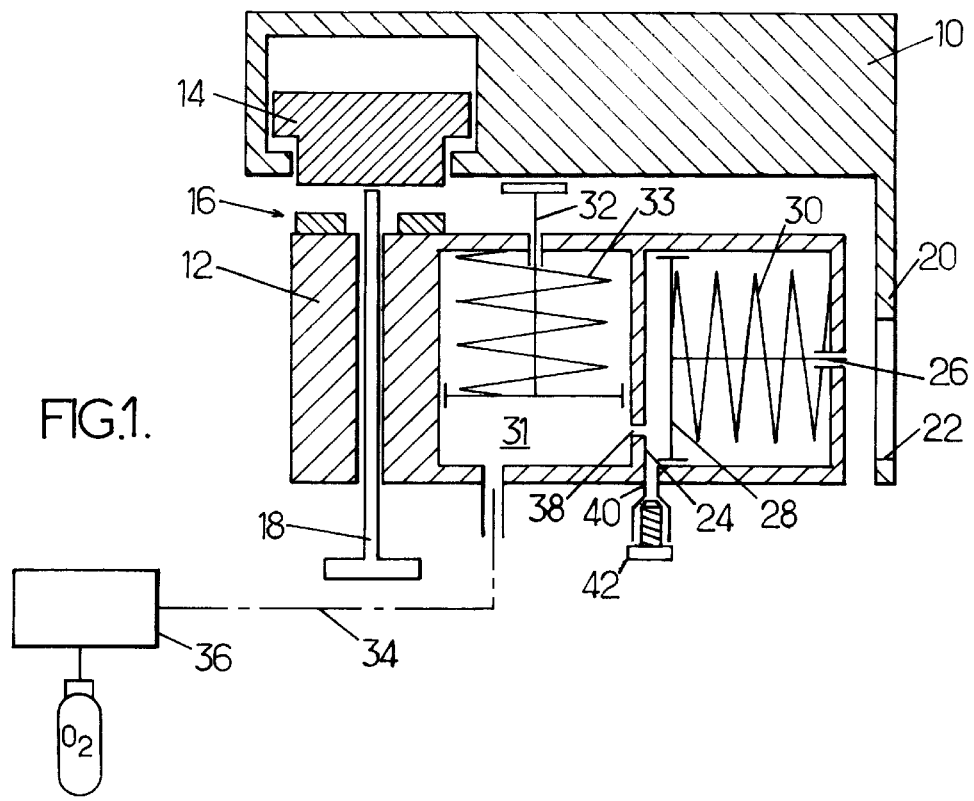
FIG. 1 is a diagram intended to show how to implement the invention, in a particular case.

The box, the catch system of which is shown diagrammatically in FIG. 1, comprises a housing or casing 10 which is closed, outside of periods of use or of inspection of the mask, by a lower door 12. This door is articulated to the housing by means which have not been depicted. It may have a conventional overall construction or a construction in accordance with patent application FR 00/10676 to which reference can be made.

A catch that keeps the door in the closed position consists of a magnet 14 mounted in the housing and of a component 16 made of ferromagnetic material, generally in the form of a washer, fixed to the door. The magnet 14 has a clearance in which it can move in the housing so that the door of an individual box can be opened manually using a tool such as a rod 18 introduced through a passage made in the door. This rod, projecting out of the door, allows the operator to push the magnet 14 back from its position shown in FIG. 1 and therefore to separate the magnet from the washer and open the door. In an alternative, the rod allows the door to be pulled. The magnet may then be fixed to the housing.

To allow the invention to be implemented, the housing comprises means for limiting the opening. The means depicted comprise an opening-limiting tab 20 having an opening 22 which is oblong or ovalized in the direction of opening, the length of which sets the extent to which the door can be partially opened for checking purposes.

Formed in the door is a chamber 24 in which the piston 28 of a plunger 26 slides. A spring 30 tends to hold the plunger in a position in which it is away from the tab 20. The dimensions of the chamber are such that the plunger can advance as far as a position in which it enters the opening 22.

Also formed in the door is a chamber 31 that houses the piston of a push-rod 32 for pneumatically opening the door. This push-rod projects upwards from the door. A spring 33 urges it into a retracted position in which it is depicted in FIG. 1. In that state, the push-rod exerts no force on the housing.

The bottom of the chamber 31 and the piston define a compartment connected to an oxygen supply pipe 34 intended also to supply the breathing masks. A control unit 36 allows the pipe 34 and therefore the chambers 31 of all the boxes to be connected either to the atmosphere or to a pressure p2 that arms the plungers 26, or to a pressure p1, higher than p2, for opening the boxes and supplying taps connected to the individual flexible tubes coupled to the masks.

The chamber 31 is connected to the chamber 24 by a calibrated hole 38 intended to slow the rise in the pressure in the chamber 24 by comparison with the rise in the chamber 31 and therefore to produce a time delay when the chamber 31 is supplied. A vent 40 plugged by a bleed screw 42 allows the chamber 24 to be connected to the atmosphere and the plunger to be retracted.

Normal operation of the box is conventional. When all the boxes have to be opened, in an emergency, the supply unit is commanded so that it provides all the chambers with a pressure at least equal to p1 and greater than p2 which is generally between 2 and 2.5 bar. The pressure in the chambers 31 rises far more quickly than the pressure in the chambers 24, as a result of the time delay, and reaches a value such that the push-rods 32 exert on the housing, a force which causes the doors to open before the plungers 26 have entered the ovalized openings of the tabs. The doors open completely and the masks, generally supported by the doors, drop down.

When, on the other hand, the doors have to be partially opened to inspect the masks, the opening operation is performed in three stages.

In a first stage, the chambers are supplied at a pressure at least equal to p2 but less than p1. In general, p2 will be between 2 and 2.5 bar when p1 is between 3 and 4 bar. This pressure p2 and the characteristics of the return spring 33 are chosen such that the push-rod 32 exerts no force for opening the door.

The calibrated hole is provided so that the pressure in the chamber 24 needed to engage the push-rod 26 in the opening 22 is reached after a time ti, generally about ten seconds. For example, it will be possible to adopt a supply at 2 bar for a duration of 15 seconds for p1=3 bar.

At the end of the time t1, the supply pressure is increased to the value p1. The push-rod 32 rises and causes the door to open. The time of a few seconds, for example 4 seconds, is generally enough to open the door partially to the extent allowed by the size of the opening 22.

During the third stage, which is the one during which the checking takes place, the supply can be brought back down to the value p2 for maintaining the plunger 26; the push-rod 32 retracts and the box remains partially open.

It remains possible for each box to be fully opened at any time. When the door is simply partially opened, all that is required is for the screw 42 to be unscrewed. Only the box whose screw has been unscrewed will open completely, because the corresponding plunger 26 retracts, It is also possible to bring about full opening of a particular box by unscrewing the bleed screw before beginning the opening sequence.

The embodiment shown in FIG. 1 constitutes just one example. The various constituents of the catch, of the pushing mechanism and of the opening-limiting mechanism may be arranged differently from those described. In particular, the arrangement may be reversed, it being possible for some of the elements indicated in FIG. 1 as belonging to the door to be transferred to the housing, and vice versa.

Figure 2:
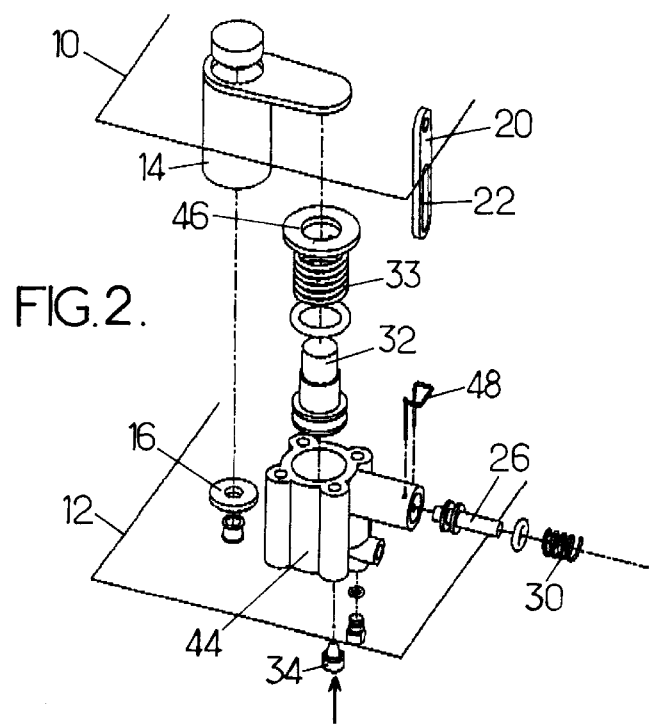
FIG. 2 is an exploded view showing the essential components of a device for implementing a particular embodiment of the invention.

In the embodiment shown in FIG. 2, the door consists of a flat panel to which is fixed a body 44 in which the chambers 31 and 24 are formed. The return spring 33 that returns the push-rod 32 is kept in compression by a washer 46 fixed to the body by means which have not been depicted. The return spring 30 of the plunger 26 is itself kept in compression by a clip 48.

Figure 3:
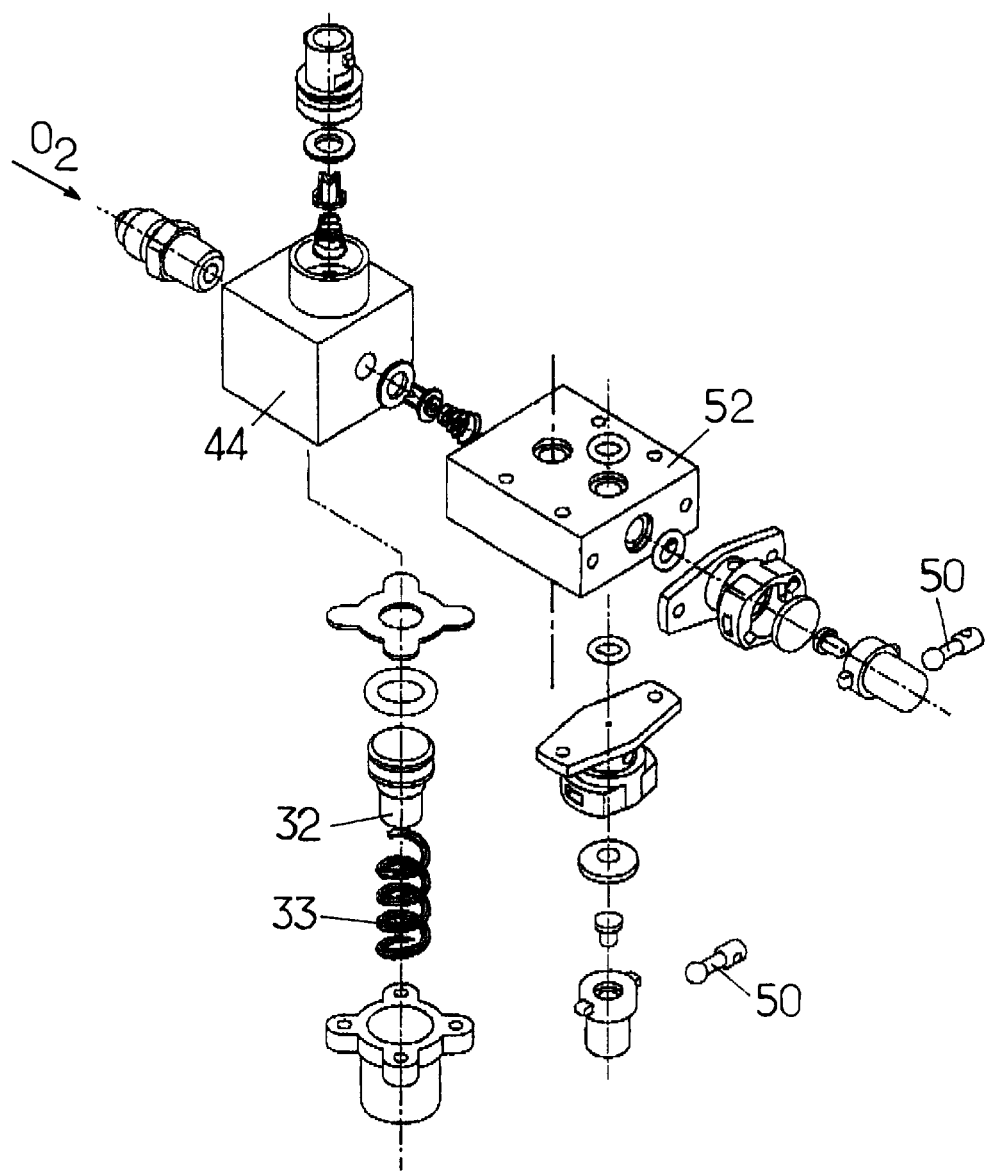
FIG. 3 is an exploded overall view of the oxygen circuit in the box according to a variant of FIG. 2.

FIG. 3 shows part of a pneumatic circuit implementing a variant of FIG. 2. The corresponding elements in the two figures are denoted by the same reference numeral. The body 44 is fixed to a distributor unit 52 allowing five masks to be supplied via a valve which is calibrated to open at the pressure p1 and each individually via a tap which is opened by pulling out a pin 50 when the passenger pulls on the cord of his mask. The means for limiting the opening have not been depicted.

Figure 4:
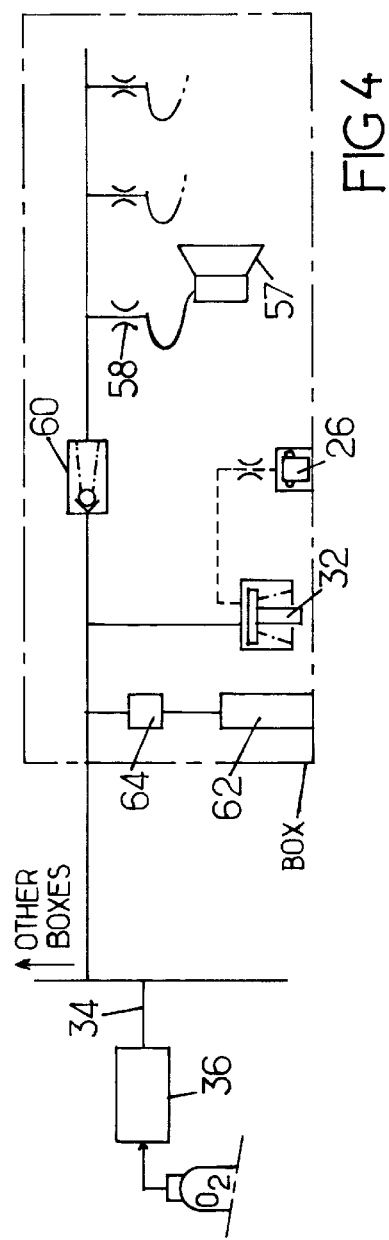
FIG. 4 is a diagram showing one method of supplying an emergency tapping.

According to another aspect of the invention, shown schematically in FIG. 4, the box comprises, in addition to the mask supply tappings, an oxygen tapping equipped with a mechanically opening valve which opens when a therapeutic mask is connected. In the case illustrated, the master oxygen supply pipe 34 is still connected in each box to the pneumatic command that disarms the catch and holds the door of the box and to a directional-control value 52. Unlocking is commanded by applying a pressure exceeding p1, from the unit 36 that operates the oxygen supply. The flexible tubes 56 supplying the masks 57, each fitted with a restrictor 58 that limits the flow, are supplied via a valve 60 which is calibrated to remain open only when the supply pressure reaches at least the threshold value of p1.

The assistance tapping 62 (which may be provided so that it is accessible without opening the box) is supplied by the pipe 34 through a valve 64 which remains open as long as the mask remains connected. Thus, the arrival of oxygen at the emergency breathing masks can be shut off as soon as the aircraft has dropped back down to a safe altitude, maintaining the supply to the first aid tappings. All that is required for that is for the relative pressure with respect to the cabin to be reduced to a value at least equal to p3 but less than p1 (and then p2 if a command for partially opening is provided, as indicated in dashed line in FIG. 4). When p2 is between 2 and 2.5 bar, a value of between 1.5 and 2 bar, depending on the value of p2, can be used.

Figure 5:
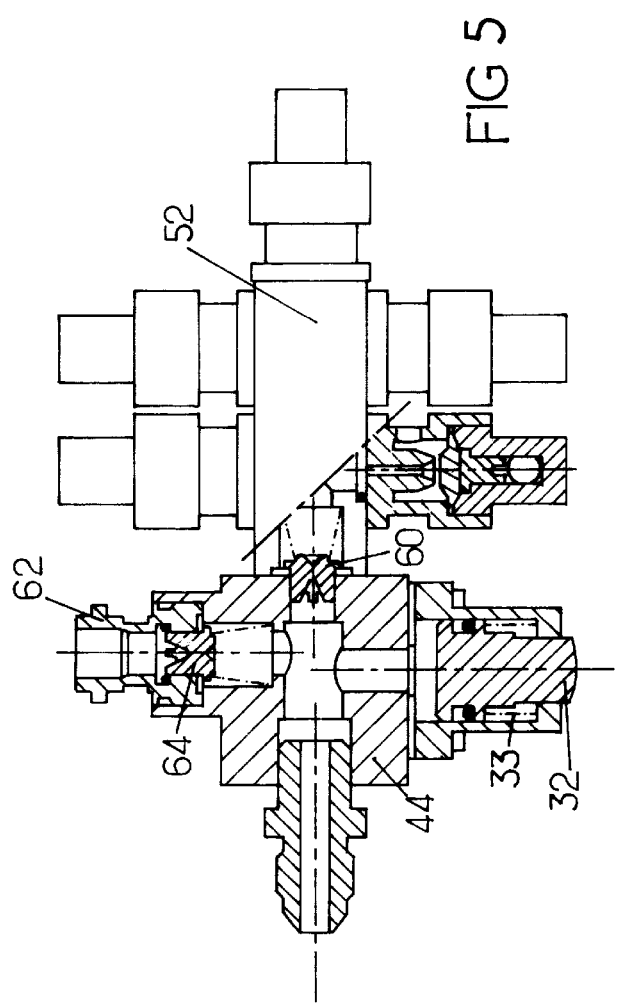
FIG. 5 is a view in part section showing one possible construction of the emergency tapping and mask supply.

The supply to the master pipe 34 is then cut off when it is no longer needed. The construction of the valve 64 may be the one depicted schematically in FIG. 5 which also shows a directional control valve making it possible to supply five masks and comprises a tapping with mechanical opening of the outlet valve when a first-aid mask is connected.

Figure 6:
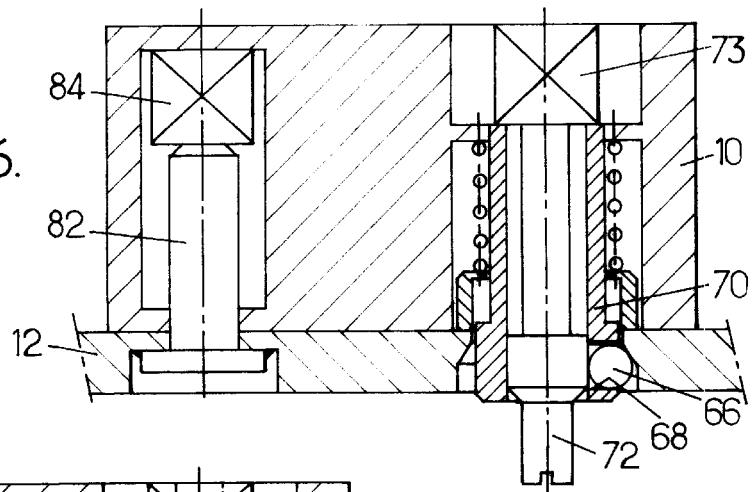
FIG. 6 is a simplified sectional view showing yet another embodiment.

The box, the catch system of which is shown schematically in FIG. 6, in which the components corresponding to those of the previous figures are denoted by the same reference numerals, also comprises a housing 10 and a door 12. The housing is in actual fact made of several assembled parts. A catch for holding the door consists of one or more beads 66 trapped in radial passages 68 of a sheath 70. When the door is closed, the beads are held in the position in which they hold the door 12 by a push-rod 72 that is kept in a lowered position by its weight (FIG. 6).

To open the door, a coil 73 carried by the housing is powered from a source, not depicted. It then attracts the push-rod from the position shown in FIG. 6 to the position of FIG. 7. This upwards movement of the push-rod brings a bulge 74 of the push-rod over the location of the beads. These then return inwards under the pressure of a flared wall 76 of an opening in the door. The door is released and can drop down. At the same time, a dish 78 sliding in a bore of the housing is brought by a spring 80 into a position in which it keeps the beads in an internal position. Because the beads 66 are thus being held by the dish, it is possible to close the door again simply by pushing it upwards.

Figure 7:
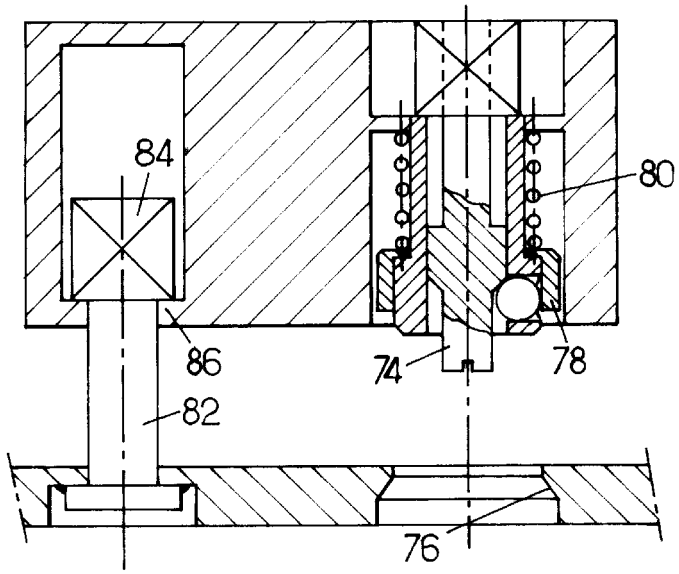
FIG. 7, similar to FIG. 6, shows the same box in the partially open state.

The means for limiting the opening of the box which are shown in FIGS. 6 and 7 comprise a plunger 82 fixed to the door and an electromagnet 84 mounted to float in a cavity of the housing. When the box is closed, the door 12 keeps the plunger 82 in the position shown in FIG. 6.

When the desire is simply to open the door partially, the electromagnet 84 and the coil 73 are both powered. The electromagnet 84 therefore holds the plunger 82 which cannot move beyond the position shown in FIG. 7 because it remains stuck to the electromagnet 84, itself retained by a rim 86 of the cavity. Unlocking of the door then causes the latter to move into the position shown in FIG. 7.

When, on the other hand, the desire is to open the box completely in order to release the masks, just the coil 73 is powered. The door 12 and the plunger 82 can then move beyond the position of FIG. 7.

As shown by FIG. 6, the push-rod projects under the door when the box is closed which means that it is possible to unlock the box and to open it simply by pressing on the protecting portion using a tool.

Figure 8:
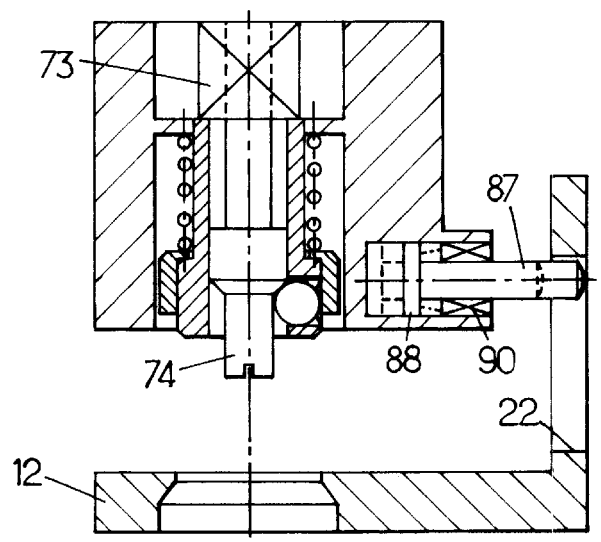
FIG. 8 is a depiction of yet another embodiment.

In the embodiment variant shown in FIG. 8, the door retaining catch has the same construction as in FIG. 6. The means for limiting opening consist of a plunger 87 which is active when it occupies the position shown in solid line in the figure, in which it enters an opening 22 formed in an angle bracket tab of the door 12. This plunger is urged by a spring 88 into a retracted position (in dashed line) in which it releases the door. A coil 90 brings the plunger 87, when this coil is powered, into the position in which it limits the opening of the door to the position shown in FIG. 8.

By powering both coils at once when the door is closed, it can be made to open partially. Powering the coil 73 alone makes it possible to bring about complete opening.

In yet another modified embodiment, the two coils are powered by the same wires, but bringing the plunger 74 into the retracted position merely demands a supply current lower than a determined threshold below which the plunger 87 remains retracted.

The embodiments shown in FIGS. 6 to 8 are of particular benefit when the masks are supplied not by an on-board oxygen network that can be supplied at adjustable pressure, but by chemical generators.

Figure 9:
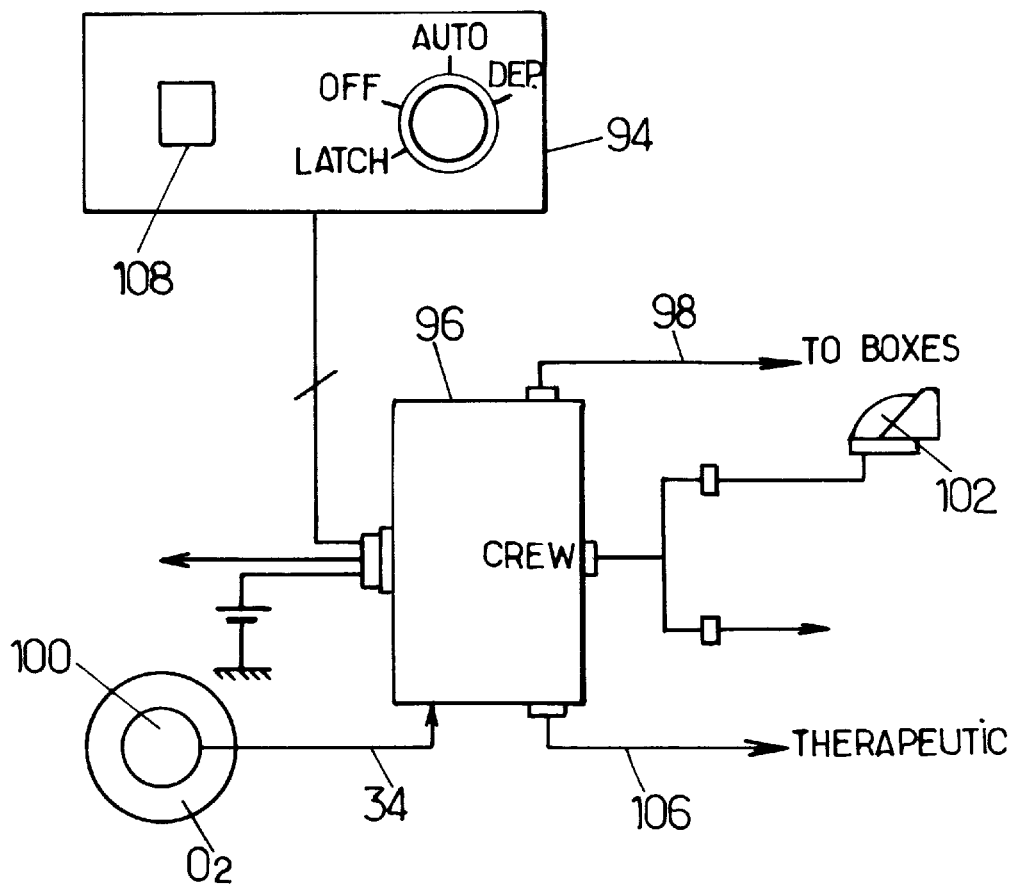
FIG. 9 is a simplified representation of an airplane oxygen distributing system according to an embodiment of the invention.

Referring to FIG. 9, the control unit of an oxygen system comprises a commmand panel 92 and a distribution unit 94. The command panel carries a rotating knob having four positions controlling the following functions:

OFF: boxes closed
AUTO: boxes are automatically fully opened upon occurrence of depressurisation
DEPLOY; boxes are fully opened when the knob is put into that position
LATCH: boxes are partially opened when the knob is turned into that position starting from OFF. The command panel delivers electrical signals to the distribution unit for achieving different sequences of operation.

Responsive to the knob being moved to AUTO by a pilot or maintainance people, the distribution unit applies oxygen pressures p2 and p1 to the pipe 98 feeding the mask boxes, in proper time succession.

When the knob is on AUTO, depressurisation sensed by a sensor (not shown) causes delivery of oxygen originating from the pressure reducer 100 of an oxygen bottle to the mask boxes and also to the oxygen masks 102 for the crew members, stored in the cockpit. The pressure p1 may be adjusted depending on the actual pressure prevailing in the cabin after the boxes have opened. It is typically reduced by distribution unit 96 when the altitude of the aircraft has decreased upon action by the pilot.

When the knob is moved to DEPLOY, the same steps as above occur whatever the cabin pressure.

In the embodiment of FIG. 9, the first aid connectors are fed via a separate line 106 upon actuation of a push button 108 rather than via the common line 98. However a modification of the system for delivery of oxygen to the common pipe at pressure p3 is possible as well.

I claim:

1. Box for housing breathing masks, comprising a housing, a door, means for delivering respiratory gas under a first pressure to said masks, a catch for holding the door in a closed position and means associated with said catch which are rendered active via a command, electrical or responsive to a second pneumatic pressure (p2), for limiting the opening of the box to a partially-open position preventing the masks from falling out upon release of the latch.

2. Box according to claim 1, having means responsive to a pressure higher than the second pressure in a pipe supplying the masks for releasing the catch.

3. Box according to claim 2, wherein said limiting means comprise a plunger carried by the door, urged by return means into a position in which it is inactive and brought pneumatically into a position in which said plunger cooperates with means carried by the housing so as to limit the opening of the door when said plunger is moved by applying the second pressure to the pipe.

4. Box according to claim 3, wherein the limiting means comprise an opening-limiting tab having an opening which is elongated in a direction of opening, a length of which determines an extent to which the door can be partially opened, said opening being arranged for receiving the plunger.

5. Box according to claim 2, further having means for delaying increase in the pressure acting on the plunger with respect to the pressure in the pipe.

6. Box according to claim 5 wherein the chamber housing the piston is connected to a chamber limited by the plunger via a calibrated restriction slowing a rise in pressure in the chamber limited by the pluger as compared with pressure rise in the chamber housing the piston and to produce a time delay when the chamber housing the piston is supplied with respiratory gas.

7. Box according to claim 6, further comprising a vent pluggable by a bleed screw and allowing the chamber limited by the plunger to be connected to atmosphere and the plunger to retract.

8. Box according to claim 2, further having means for disarming the catch comprising a chamber for housing a piston of a push-rod which is urged by spring means into a retracted position and which is forcibly moved to a position causing pneumatic opening of the door when the pressure in the chamber reaches the first value.

9. A system comprising a plurality of boxes each of which according to claim 2, further comprising control means for connecting the pipe in each box to atmosphere, to said first pressure, to said second pressure and to said higher pressure at will.

10. Box for housing breathing masks, comprising:

a housing for storing a plurality of breathing masks, a door for closing said housing and retaining said masks, pipe means for delivering respiratory gas to said masks, a catch for holding the door in a closed position, arranged to be de-activated responsive to delivery of respiratory gas under a pressure at least equal to a first pressure, and means for limiting the opening of the box to a partially-open position preventing the masks from falling out upon release of the latch, which are rendered active responsive to presence of a second pneumatic pressure lower than said first pressure for at least a predetermined time duration, in said pipe.

11. A system comprising:

a plurality of boxes each for housing breathing masks and each comprising:

a housing for storing a plurality of breathing masks, a door for closing said housing and retaining said masks, pipe means for delivering respiratory gas to said masks, a catch for holding the door in a closed position, arranged to be released responsive to delivery of respiratory gas under a pressure at least equal to a first pressure, and means for limiting the opening of the box to a partially-open position preventing the masks from falling out upon release of the latch, which are rendered active responsive to presence of a second pneumatic pressure lower than said first pressure for at least a predetermined time duration, and control means for optionally connecting the pipe means in all said boxes either to atmosphere for maintaining the latch in active condition, or to respiratory gas to said first pressure, or in time succession to said second pressure and later to said first pressure after said limiting means have become operative for limiting a degree of opening of the boxes.

* * * * *